June 27, 1961 J. F. McCRORY 2,990,158
TIRE BANDING APPARATUS
Filed Dec. 12, 1958 3 Sheets-Sheet 1
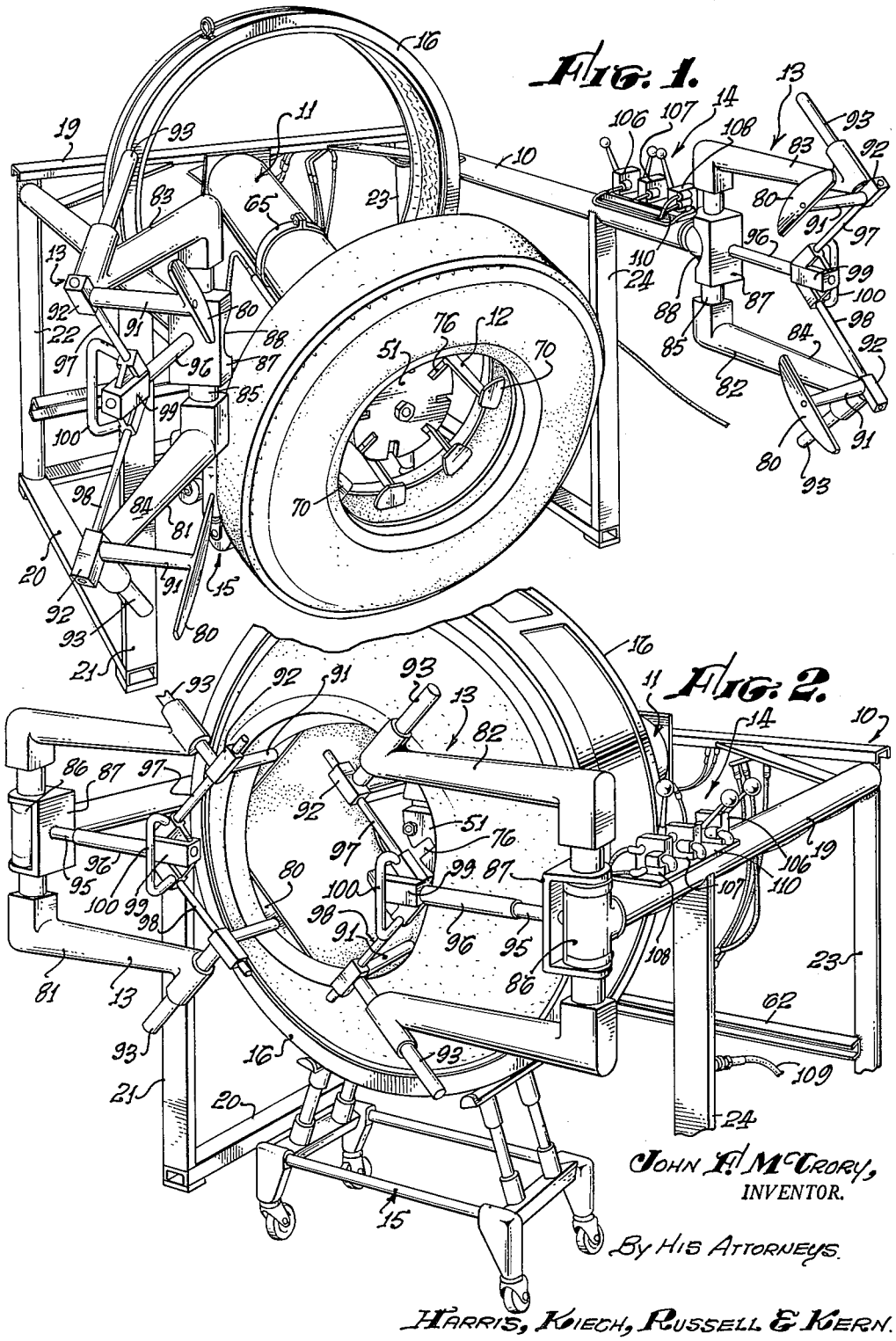
JOHN F. McCRORY,
INVENTOR.
By His Attorneys
HARRIS, KIECH, RUSSELL & KERN.

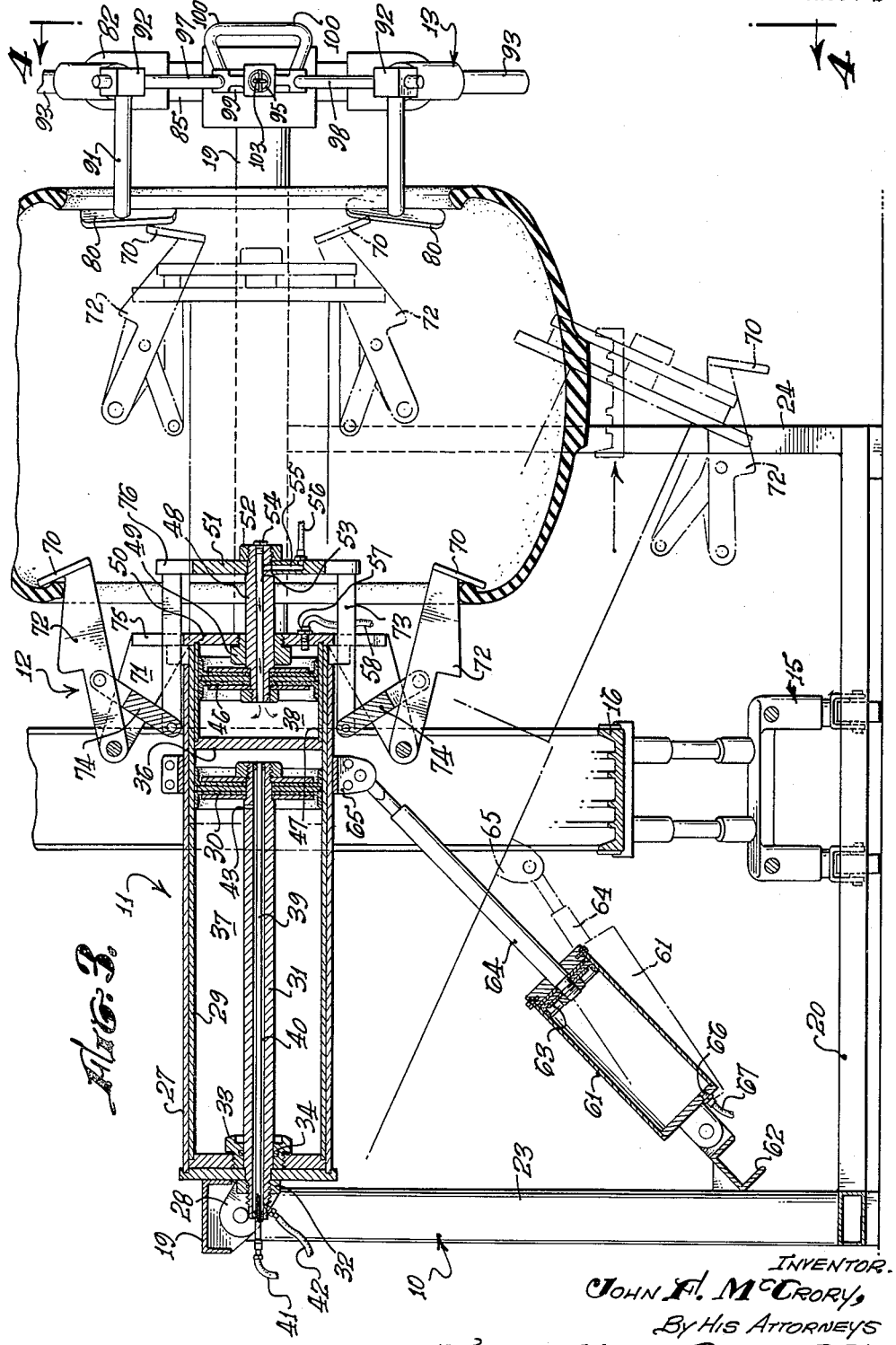

June 27, 1961  J. F. McCRORY  2,990,158
TIRE BANDING APPARATUS
Filed Dec. 12, 1958  3 Sheets-Sheet 3

John F. McCrory,
INVENTOR.

BY HIS ATTORNEYS.

Harris, Kiech, Russell & Kern.

United States Patent Office 2,990,158
Patented June 27, 1961

2,990,158
TIRE BANDING APPARATUS
John F. McCrory, Los Angeles, Calif., assignor to Balloon Tire Mould Co., Inc., Los Angeles, Calif., a corporation of California
Filed Dec. 12, 1958, Ser. No. 780,079
4 Claims. (Cl. 254—50.3)

This invention relates to a tire banding apparatus suitable for use in recapping tires, providing means for inserting a tire into and removing the tire from a band mold used in curing the new rubber onto the prepared tire.

It is an object of the invention to provide an apparatus which engages and grips opposing beads of a tire to spread the tire and thereby contract its outside diameter so that a band mold can be positioned over the tire, after which the tire is despread and permitted to expand into the mold. The mold may be removed by reversing the operation. A further object is to provide such an apparatus which provides for inserting and removing a curing tube and rim during the spreading operation.

It is a further object of the invention to provide tire banding apparatus including a power piston which engages the tire while on the floor, raises the tire to the working position for engagement with another set of bead-engaging arms, and after engagement moves the beads of the tire apart to spread the tire and reduce its diameter. A further object is to provide an apparatus wherein the power piston is horizontally disposed to maintain the tire in a vertical position with the tire band mold carried on a dolly which positions the mold around the piston, permitting the mold to be rolled into position around the spread tire. Another object of the invention is to provide such an apparatus wherein the center of the bead-engaging arms and, therefore, the center of the tire is maintained in horizontal alignment with the center of the band mold carried on the dolly to permit evenly securing the entire uncured area of the tire into the band.

It is an object of the invention to provide a tire banding apparatus having a horizontally disposed U-shaped frame with the tire lifting and supporting unit positioned within the frame. A further object is to provide such an apparatus having gate members at the open end of the frame which swing open to permit insertion and removal of the tire and band mold and which carry the outer bead-engaging arms. Another object of the invention is to provide such an apparatus wherein the outer bead-engaging arms are slidably carried on the gate members to provide radial movement of the arms so that the apparatus may be used with various sizes of tires while applying equal pressures with all arms.

It is a further object of the invention to provide such an apparatus wherein the tire lifting and supporting means includes concentrically disposed cylinders and axially disposed pistons for projecting and retracting the inner bead-engaging arms and, therefore, the tire and for expanding and contracting the bead-engaging arms. Another object is to provide such an apparatus powered by fluid under pressure with the fluid being directed to the proper chambers through passages within the piston shafts of the cylinders.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 1 is an isometric view of a preferred embodiment of the invention showing an uncured tire being positioned in the apparatus;

FIG. 2 is an isometric view of the structure of FIG. 1 showing the tire partially spread with the band mold positioned therearound;

FIG. 2 is a sectional view taken along a central vertical plane showing a tire fully spread;

Figure 4:
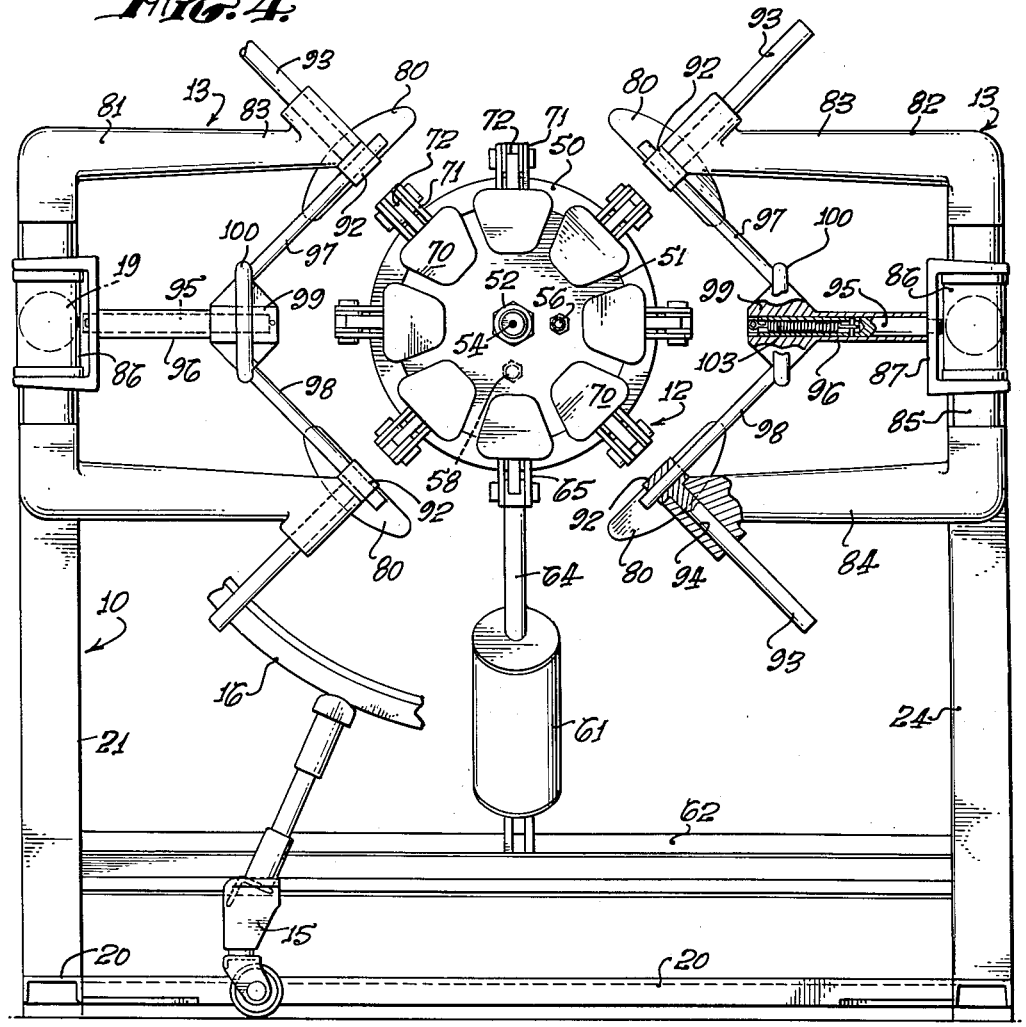
FIG. 4 is an end view of the structure taken on line 4—4 of FIG. 3, with the tire removed.

The preferred embodiment of the invention shown in the drawings includes a frame 10, a piston and cylinder assembly 11, an inner arm system 12, an outer arm system 13, a control unit 14, and a dolly 15 with a band mold 16 resting thereon.

The frame 10 is a U-shaped structure defining a tire spreading zone therein and is preferably horizontally disposed as shown in the drawings. The structural details of the frame are not a feature of the invention; however, the frame should be strong and rigid as considerable force is exerted in spreading the tires. In the embodiments shown herein, a U-shaped upper structure 19 is spaced from a U-shaped base 20 by vertical members 21, 22, 23, 24, the elements being welded together to form a rigid frame.

The piston and cylinder assembly is best seen in FIG. 3. This important portion of the apparatus of the invention grips one bead of a tire, lifts the tire from the floor to the working position, positions the tire for engagement by the outer arm system, and provides the force for spreading the tire. A cylinder 27 is pivotally mounted by means of a lug 28 to the upper structure 19 of the frame in the central portion or bight of the U-shaped structure. A cylinder 29 is slidingly positioned within the cylinder 27 and a piston 30 is positioned within the cylinder 29. The piston 30 is supported at one end of a shaft 31 which extends through the cylinders 29 and 27, the other end of the shaft being fixed to the cylinder 27 by a nut 32. A bushing 33 and a seal 34 provide sliding engagement between the shaft 31 and the inner cylinder 29.

A plate 36 is fixed within the cylinder 29, dividing the cylinder into two chambers 37, 38. A tube 39 is sealed within a passage 40 in the shaft 31 to provide communication between a line 41 and the right-hand side of the chamber 37. A line 42 is coupled to the passage 40 adjacent the exterior end of the shaft 31 and a lateral passage 43 in the shaft 31 provides communication between the line 42 and the left side of the chamber 37 through the axial passage 40.

A piston 46 is slidably positioned within a liner 47 fixed to the inner wall of the cylinder 29 within the chamber 38. The piston 46 carries a shaft 48 which slides in a bushing 49 carried in an end plate 50 of the cylinder 29. A plate 51 is fixed to the outer end of the shaft 48 by a nut 52. An axial passage 53 in the shaft 48 is plugged at its outer end by a screw 54. A passage 55 in the plate 51 provides communication between a line 56 and the left side of the chamber 38 through the axial passage 53 and a connecting lateral passage in the shaft. A fitting 57 in the plate 50 provides communication between a line 58 and the right side of the chamber 38.

A cylinder 61 is pivotally mounted at one end on a crossbar 62 which is carried between the vertical members 22, 23. A piston 63 is slidably carried within the cylinder 61 on a shaft 64 with the exterior end of the shaft pivotally coupled to a band 65 fixed to the cylinder 27. A fitting 66 in the lower end of the cylinder 61 provides communication between a line 67 and the interior of the cylinder.

The inner arm system provides means for engaging and gripping the bead of a tire. A plurality of pads or plates 70 are moved in a radial direction between a contracted position, as seen in FIG. 4, for positioning within a tire and an expanded position, as seen in FIGS. 1 and 3, for gripping the bead of a tire. Eight brackets 71 (FIGS. 3 and 4) are equally spaced around the plate 50. Each pad 70 is carried on an arm 72 which is pivotally mounted on the corresponding bracket 71. Eight brackets 73 are carried on the plate 51 with each bracket being coupled to a corresponding arm 72 by a link 74. The brackets 73 pass through corresponding slots 75 in the plate 50 while slots 76 are provided in the plate 51 for receiving the arms 72 when the arm system is contracted.

The outer arm system 13 carries a plurality of bead-engaging pads or plates 80. An important feature of the apparatus is the provision of supports for these pads so that the pads are equally spaced around the periphery of a bead of a tire regardless of the size of the tire being handled in the apparatus. The outer arm system includes two gate members 81, 82 which are carried at the respective ends of the upper structure 19 of the frame for pivoting between an open position as shown in FIG. 1 and a closed position as shown in FIG. 2. The gate members are identical and the member 82 will be described in detail. A pair of arms 83, 84 are carried on a tube 85 which rotates within a sleeve 86, the sleeve being fixed to the structure 19. A U bracket 87 is positioned over the sleeve 86 and fixed to the tube 85 for vertically locating the gate member and limiting pivotal movement thereof by engagement of the surface 88 (FIG. 1) with the frame.

Each pad 80 is carried on an arm 91 projecting from a block 92, the block being carried on a rod 93. The rods 93 are slidably positioned in passages 94 in the arms 83, 84, with the passages being at 45° to the vertical. The passages are positioned so that their axes intersect at a point with the axis of the piston and cylinder assembly 11 also passing through this point when the assembly is in the horizontal position as shown in FIG. 3.

A rod 95 is fixed at one end to the U bracket 87, the rod being disposed horizontally with its axis also passing through the point. A tube 96 is slidably positioned on the rod 95. Guide rods 97, 98 are carried in a block or arm guide 99 which is fixed to the inner end of the tube 96, a handle 100 also being carried on the block 99. The guide rods 97, 98 are disposed at 90° to each other and at 45° to the horizontal, with the guide rod 97 slidingly passing through the block 92 carried on the arm 83 and the guide rod 98 passing through the corresponding block carried by the arm 84. Each guide rod is then perpendicular to the corresponding rod 93. A tension spring 103 is fixed within a counterbore in the rod 95 with one end of the spring fixed to the rod 95 and the other end to the tube 96 to urge the pads toward the expanded position as seen in FIGS. 1 and 4.

Figure 5:
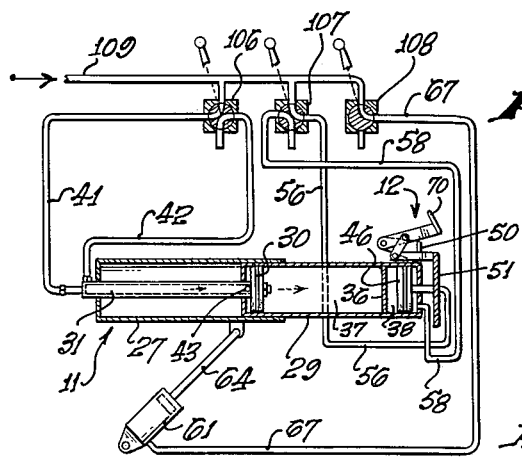
FIG. 5 is a diagram showing the pneumatic system of the apparatus.

A pneumatic power system is used in the embodiment illustrated herein with the cylinders being exhausted to the atmosphere. Of course, a closed hydraulic system could be used if preferred. Compressed air is supplied to valves 106, 107, 108 of the control unit 14 through line 109. The valves are mounted on a plate 110 carried on the structure 19 and are coupled to the various cylinders by conventional piping as shown in the diagram of FIG. 5.

The dolly 15 supports a conventional band mold 16, the height of the dolly preferably being chosen so that the center of the mold coincides with the point of intersection of the rods 93 and the axis of the piston and cylinder assembly. The significance of this intersection will be discussed in conjunction with the description of the operation of the apparatus.

The tire banding apparatus of the invention is used in the tire recapping process. With the gate members open as shown in FIG. 1, the piston and cylinder assembly 11 is raised to the horizontal position by moving valve 108 to the left as shown in FIG. 5 to admit air under pressure into the cylinder 61. The dolly with the band mold positioned thereon is rolled into the tire spreading zone within the U-shaped frame with the assembly 11 passing through the mold as shown in FIG. 1. The valve 108 is then moved to the right to exhaust the cylinder 61 and move the piston and cylinder assembly 11 to the down position as shown in the lower phantom view in FIG. 3.

Valve 107 is moved to the right to apply compressed air to the line 58 and contract the inner arm system to the position shown in FIG. 4. The valve 106 is moved to the left to couple air under pressure to the line 41 and project the cylinder 29 from the cylinder 27. Then a tire having a new outer layer of uncured rubber cemented thereto is positioned within the frame with the pads 70 disposed inside the tire. Valve 107 is moved to the left to expand the inner arm system and cause the pads 70 to engage and grip one bead of the tire, as shown in FIG. 1. Then the valve 108 is actuated to energize the cylinder 61 and raise the assembly 11 with the tire thereon to the horizontal position. The gate members are swung to the closed position and the pads 80 are engaged with the other bead of the tire by pulling the blocks 99 toward the center against the urging of the springs 103. After the pads are engaged with the bead, the blocks are released and the springs pull the pads to the position shown in FIG. 2. The relative sliding motions of the blocks 92 on the rods 97, 98 and the rods 93 in the arms 83, 84 position the four pads 80 equally around the periphery of the bead regardless of the size of the bead. This spacing is also maintained even though the bead may stretch during the tire-spreading operation. The valve 106 is now moved to the right to retract the cylinder 29 into the cylinder 27 and spread the tire to the condition shown in FIG. 3. This spreading results in a reduction in the diameter of the tire and permits the band 16 to be positioned around the tread of the tire as shown in FIG. 2.

When the band mold is properly positioned, the valve 106 is again actuated to project the cylinder 29 and despread the tire. It should be noted that during the spreading and despreading operations, the outer bead of the tire is maintained fixed relative to the frame by the outer arm system while the inner bead and, therefore, the tread of the tire moves relative to the frame. Hence, during the despreading step, it is necessary to move the band in order to properly center the band on the tire. In the apparatus of the invention where the center of the mold is coincident with the center of the tire and the mold is carried on the free rolling dolly, the mold is automatically centered as the tire is despread following initial engagement of the tread with the mold. The mold is accurately positioned by the dolly and this positioning is maintained as the mold is moved parallel to the axis of the piston and cylinder assembly with the uncured tread expanding into the mold. Movement of the cylinder 29 is arrested with the tire partially spread and with the band mold securely positioned thereopoint. Then the conventional curing tube and curing rim are installed within the tire and the tire is completely despread.

The pads 80 are disengaged from the outer bead by manually pulling the blocks 99 toward the center of the structure and swinging the gate members out to the opened position. The valve 107 is actuated to contract the inner arm system and the tire with the mold in place is rolled away on the dolly to the curing oven. After curing, the tire is returned to the banding apparatus for removal of the band mold, which is accomplished by reversing the sequence of steps outlined above.

The apparatus of the invention provides a structure for handling a tire to install the tire into and remove it from a band mold and to install and remove a curing tube and rim. The apparatus includes inner and outer arm systems which uniformly engage and grip the beads of the tire providing equalization of forces during the spreading operation. A concentric set of cylinders and pistons carry out the tire handling operations, it being only necessary to manually roll the tire to the apparatus and roll it away on a dolly. The horizontally disposed U-shaped frame permits banding and unbanding of the tire with the tire disposed in a vertical plane so that lifting of the tire and band into and out of the banding apparatus and into and out of the curing unit is done away with.

Although an exemplary embodiment of the invention has been disclosed and discussed, it will be understood that other applications of the invention are possible and that the embodiments disclosed may be subjected to various changes, modifications and substitutions without necessarily departing from the spirit of the invention.

I claim as my invention:

1. In a tire banding apparatus, the combination of: a U-shaped rigid frame enclosing a tire spreading zone; a piston and cylinder assembly mounted at one end on the bight of said U-shaped frame and projecting into said zone; means carried at the other end of said assembly for engaging one bead of a tire; gate members mounted at the respective ends of said U-shaped frame, said gate members being pivoted toward and away from each other between a closed and open position; a plurality of outer bead-engaging arms slidably carried on each of said gate members, with the lines of movement of all of said arms intersecting at a point when said gates are in said closed position; an arm guide carried on each of said gate members, each of said arm guides being movable relative to its associated gate member along a line passing through said point; a guide rod corresponding to each of said outer arms, each guide rod being fixed to the corresponding arm guide for movement toward and away from said point, with each guide rod disposed perpendicular to a radius from said point and with each outer arm engaging and slidable along the corresponding guide rod; and means for actuating said piston and cylinder assembly to move said other end thereof toward and away from said outer arms.

2. In a tire banding apparatus, the combination of: a frame; a first cylinder mounted on said frame; a second cylinder carried by said first cylinder and movable axially relative thereto, said second cylinder being divided into first and second chambers; a first piston slidably positioned within said first chamber and fixed relative to said first cylinder; means for introducing fluid under pressure into said first chamber on either side of said first piston to move said second cylinder relative to said first cylinder; a set of bead-engaging arms carried on said second cylinder; a second piston slidably positioned within said second chamber and including a shaft passing through an end thereof; a linkage coupling said shaft to said set of arms; and means for introducing fluid under pressure into said second chamber on either side of said second piston to move said shaft relative to said second cylinder and expand and contract said set of arms.

3. In a tire banding apparatus, the combination of: a frame; a first cylinder mounted on said frame; a second cylinder positioned within and concentric with said first cylinder and movable axially relative thereto, said second cylinder being divided into first and second chambers; a first piston carried on a first coaxial shaft extending into said second cylinder from said first cylinder, with said first piston slidably positioned within said first chamber; means for introducing fluid under pressure into said first chamber on either side of said first piston to move said second cylinder into and out of said first cylinder; a set of bead-engaging arms carried on said second cylinder; a second piston slidably positioned within said second chamber and including a second coaxial shaft passing through the end of said second cylinder opposite said first shaft; a linkage coupling said second shaft to said set of arms; and means for introducing fluid under pressure into said second chamber on either side of said second piston to move said second shaft into and out of said second cylinder and expand and contract said set of arms.

4. In a tire banding apparatus, the combination of: a frame; a first cylinder mounted on said frame; a second cylinder positioned within and concentric with said first cylinder and movable axially relative thereto, said second cylinder being divided into first and second chambers; a first piston carried on a first coaxial shaft extending into said second cylinder from said first cylinder, with said first piston slidingly positioned within said first chamber, said first shaft having two fluid passages therein with one passage extending from outside said cylinders to said first chamber on one side of said first piston and the other passage extending from outside said cylinders to said first chamber on the other side of said first piston; a set of bead-engaging arms carried on said second cylinder; a second piston slidably positioned within said second chamber and including a second coaxial shaft passing through the end of said second cylinder opposite said first shaft; and a linkage coupling said second shaft to said set of arms, said second shaft haivng a fluid passage therein extending from outside said cylinders to the side of said second piston opposite said linkage.

References Cited in the file of this patent

UNITED STATES PATENTS

| | | |
|---|---|---|
| 1,908,311 | Branick | May 9, 1933 |
| 2,250,740 | Anderson | July 29, 1941 |
| 2,778,414 | Oglesby | Jan. 22, 1957 |
| 2,872,704 | Schaevitz | Feb. 10, 1959 |